(12) United States Patent
Cardenuto et al.

(10) Patent No.: US 11,537,351 B2
(45) Date of Patent: Dec. 27, 2022

(54) SYSTEMS AND METHODS FOR VIRTUAL AND AUGMENTED REALITY

(71) Applicant: MAGIC LEAP, INC., Plantation, FL (US)

(72) Inventors: Rodolpho C. Cardenuto, Plantation, FL (US); David Charles Lundmark, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/990,161

(22) Filed: Aug. 11, 2020

(65) Prior Publication Data
US 2021/0048972 A1    Feb. 18, 2021

Related U.S. Application Data

(60) Provisional application No. 62/885,794, filed on Aug. 12, 2019.

(51) Int. Cl.
*G06F 3/14* (2006.01)
*G06F 3/01* (2006.01)
*G02B 27/01* (2006.01)

(52) U.S. Cl.
CPC ......... *G06F 3/1454* (2013.01); *G02B 27/017* (2013.01); *G06F 3/01* (2013.01); *G06F 3/011* (2013.01)

(58) Field of Classification Search
CPC ............. G06F 3/04815; G06F 3/04842; G06F 3/0482; G06F 3/04845; G06F 3/011; G06F 3/012; G06F 3/013; G06T 13/40; G06T 19/003; G06T 19/006; G02B 27/017; G02B 2027/014; G02B 27/0172; G02B 2027/0178; G02B 27/0176; A63F 2300/8082; A63F 345/633; A63F 345/08
(Continued)

(56) References Cited

U.S. PATENT DOCUMENTS 5,495,576 A   2/1996  Ritchey
6,947,219 B1  9/2005  Ou
(Continued)

FOREIGN PATENT DOCUMENTS

WO   WO 2012020527    2/2012
WO   WO 2017/030985   2/2017

OTHER PUBLICATIONS

PCT International Search Report and Written Opinion for International Appln. No. PCT/US20/45731, Applicant Magic Leap, Inc., dated Dec. 22, 2020 (18 pages).
(Continued)

*Primary Examiner* — Koosha Sharifi-Tafreshi
(74) *Attorney, Agent, or Firm* — Vista IP Law Group, LLP (57) ABSTRACT

A computer implemented method of facilitating communication between first and second users includes displaying, by a first head-worn device, a first virtual object to the first user first user wearing the first head-worn device. The method also includes displaying, by a second head-worn device, a second virtual object to the second user wearing the second head-worn device. The method further includes facilitating, by the first and second head-worn devices, communications between the first and second users using the first and second virtual objects to simulate the first and second users being present in a common environment.

26 Claims, 4 Drawing Sheets

(58) Field of Classification Search
USPC .................................................... 345/8, 633
See application file for complete search history.

(56) References Cited

U.S. PATENT DOCUMENTS

| | | | |
|---|---|---|---|
| 7,386,799 | B1 | 6/2008 | Clanton et al. |
| 9,215,293 | B2 | 12/2015 | Miller |
| 9,255,813 | B2 | 2/2016 | Liu et al. |
| 9,551,873 | B2* | 1/2017 | Zalewski ............. G02B 27/017 |
| 9,958,934 | B1 | 5/2018 | Mullen |
| 10,068,374 | B2 | 9/2018 | Miller et al. |
| 10,234,939 | B2 | 3/2019 | Miller et al. |
| 10,282,907 | B2 | 5/2019 | Miller et al. |
| 10,967,270 | B2 | 4/2021 | Mullen |
| 2003/0137449 | A1 | 7/2003 | Vashisth et al. |
| 2005/0148388 | A1 | 7/2005 | Vayra et al. |
| 2005/0254135 | A1 | 11/2005 | Ou |
| 2006/0007056 | A1 | 1/2006 | Ou |
| 2006/0105838 | A1 | 5/2006 | Mullen |
| 2008/0005702 | A1 | 1/2008 | Skourup et al. |
| 2008/0071559 | A1 | 3/2008 | Arrasvuori |
| 2008/0130950 | A1* | 6/2008 | Miklos ................... G06F 3/013 382/103 |
| 2008/0215974 | A1 | 9/2008 | Harrison et al. |
| 2008/0215975 | A1 | 9/2008 | Harrison et al. |
| 2008/0215994 | A1 | 9/2008 | Harrison et al. |
| 2008/0303811 | A1 | 12/2008 | Van Luchene |
| 2009/0066690 | A1 | 3/2009 | Harrison |
| 2009/0089685 | A1 | 4/2009 | Mordecai et al. |
| 2009/0164916 | A1 | 6/2009 | Jeong et al. |
| 2009/0187389 | A1 | 7/2009 | Dobbins et al. |
| 2009/0221368 | A1 | 9/2009 | Yen et al. |
| 2009/0222424 | A1 | 9/2009 | Van |
| 2009/0293012 | A1 | 11/2009 | Alter et al. |
| 2010/0060647 | A1 | 3/2010 | Brown et al. |
| 2010/0085462 | A1 | 4/2010 | Sako et al. |
| 2010/0197390 | A1 | 8/2010 | Craig et al. |
| 2011/0009193 | A1 | 1/2011 | Bond et al. |
| 2011/0096337 | A1 | 4/2011 | Hirose et al. |
| 2011/0246908 | A1 | 10/2011 | Akram et al. |
| 2011/0313653 | A1 | 12/2011 | Lindner |
| 2012/0068913 | A1 | 3/2012 | Bar-zeev et al. |
| 2012/0075463 | A1 | 3/2012 | Chen et al. |
| 2012/0087580 | A1 | 4/2012 | Woo et al. |
| 2012/0092328 | A1 | 4/2012 | Flaks et al. |
| 2012/0127062 | A1 | 5/2012 | Bar-zeev et al. |
| 2012/0127284 | A1 | 5/2012 | Bar-zeev et al. |
| 2012/0154557 | A1 | 6/2012 | Perez et al. |
| 2012/0182313 | A1 | 7/2012 | Ahn et al. |
| 2012/0183137 | A1 | 7/2012 | Laughlin |
| 2012/0206452 | A1 | 8/2012 | Geisner et al. |
| 2012/0212399 | A1 | 8/2012 | Border et al. |
| 2012/0244939 | A1 | 9/2012 | Braun |
| 2012/0249586 | A1 | 10/2012 | Wither et al. |
| 2012/0249741 | A1* | 10/2012 | Maciocci ............. G06T 15/503 348/46 |
| 2013/0044128 | A1 | 2/2013 | Liu et al. |
| 2013/0050258 | A1 | 2/2013 | Liu et al. |
| 2013/0050260 | A1 | 2/2013 | Reitan et al. |
| 2013/0050432 | A1 | 2/2013 | Perez et al. |
| 2013/0342571 | A1 | 2/2013 | Kinnebrew et al. |
| 2013/0117377 | A1 | 5/2013 | Miller |
| 2013/0141419 | A1 | 6/2013 | Mount et al. |
| 2013/0194164 | A1 | 8/2013 | Sugden et al. |
| 2013/0215230 | A1 | 8/2013 | Miesnieks et al. |
| 2013/0249946 | A1 | 9/2013 | Kimura |
| 2013/0281207 | A1 | 10/2013 | Lyons et al. |
| 2013/0293468 | A1 | 11/2013 | Perez et al. |
| 2013/0342564 | A1 | 12/2013 | Kinnebrew et al. |
| 2014/0178029 | A1 | 6/2014 | Raheman et al. |
| 2014/0204077 | A1 | 7/2014 | Kamuda et al. |
| 2014/0266990 | A1 | 9/2014 | Makino et al. |
| 2014/0306866 | A1 | 10/2014 | Miller et al. |
| 2014/0354685 | A1 | 12/2014 | Lazarow et al. |
| 2014/0368532 | A1 | 12/2014 | Keane et al. |
| 2015/0097865 | A1 | 4/2015 | Subramanian et al. |
| 2015/0163473 | A1* | 6/2015 | Osawa .................. G06T 3/4038 348/53 |
| 2015/0215351 | A1* | 7/2015 | Barzuza ............... H04L 12/1827 715/757 |
| 2015/0235435 | A1* | 8/2015 | Miller ................ G02B 27/0172 345/633 |
| 2015/0254793 | A1 | 9/2015 | Hastings et al. |
| 2016/0093106 | A1 | 3/2016 | Black |
| 2016/0225188 | A1* | 8/2016 | Ruddell .................. G06F 3/011 |
| 2016/0234475 | A1 | 8/2016 | Courchesne et al. |
| 2016/0321841 | A1* | 11/2016 | Christen ............... G02B 27/017 |
| 2016/0371884 | A1* | 12/2016 | Benko ................ H04N 5/23229 |
| 2017/0092000 | A1* | 3/2017 | Schwimmer ......... H04N 13/204 |
| 2017/0127023 | A1 | 5/2017 | High et al. |
| 2018/0342101 | A1 | 11/2018 | Ziman |
| 2019/0371075 | A1* | 12/2019 | Stafford ................ G06F 3/0482 |
| 2020/0051336 | A1* | 2/2020 | Ichikawa ............... G06T 19/006 |
| 2020/0117270 | A1* | 4/2020 | Gibson ................... G06T 17/00 |

OTHER PUBLICATIONS

Final Office Action for U.S. Appl. No. 14/702,710 dated May 2, 2018.

Final Office Action for U.S. Appl. No. 14/702,710 dated May 18, 2017.

Final Office Action for U.S. Appl. No. 14/702,710 dated May 12, 2016.

Non-Final Office Action for U.S. Appl. No. 14/702,710 dated Nov. 2, 2017.

Non-Final Office Action for U.S. Appl. No. 14/702,710 dated Aug. 26, 2016.

Non-Final Office Action for U.S. Appl. No. 14/702,710 dated Jul. 8, 2015.

Notice of Allowance for U.S. Appl. No. 14/702,710 dated Dec. 19, 2018.

Amendment Response to NFOA for U.S. Appl. No. 14/702,710 dated Mar. 2, 2018.

Amendment Response to NFOA for U.S. Appl. No. 14/702,710 dated Jan. 25, 2017.

Amendment Response to NFOA for U.S. Appl. No. 14/702,710 dated Jan. 8, 2016.

Amendment Response to FOA for U.S. Appl. No. 14/702,710 dated Sep. 4, 2018.

Amendment Response to FOA for U.S. Appl. No. 14/702,710 dated Sep. 18, 2017.

Amendment Response to FOA for U.S. Appl. No. 14/702,710 dated Aug. 10, 2016.

Final Office Action for U.S. Appl. No. 14/703,854 dated Nov. 30, 2017.

Final Office Action for U.S. Appl. No. 14/703,854 dated Jan. 13, 2017.

Final Office Action for U.S. Appl. No. 14/703,854 dated Feb. 12, 2016.

Non-Final Office Action for U.S. Appl. No. 14/703,854 dated Aug. 10, 2018.

Non-Final Office Action for U.S. Appl. No. 14/703,854 dated May 4, 2017.

Non-Final Office Action for U.S. Appl. No. 14/703,854 dated Jun. 16, 2016.

Non-Final Office Action for U.S. Appl. No. 14/703,854 dated Jul. 2, 2015.

Notice of Allowance for U.S. Appl. No. 14/703,854 dated Mar. 11, 2019.

Amendment Response to NFOA for U.S. Appl. No. 14/703,854 dated Nov. 13, 2018.

Amendment Response to NFOA for U.S. Appl. No. 14/703,854 dated Aug. 4, 2017.

Amendment Response to NFOA for U.S. Appl. No. 14/703,854 dated Oct. 10, 2016.

Amendment Response to NFOA for U.S. Appl. No. 14/703,854 dated Nov. 2, 2015.

(56) References Cited

OTHER PUBLICATIONS

Amendment Response to FOA for U.S. Appl. No. 14/703,854 dated Jan. 29, 2018.
Amendment Response to FOA for U.S. Appl. No. 14/703,854 dated May 12, 2016.
Amendment Response to FOA for U.S. Appl. No. 14/703,854 dated Apr. 12, 2017.
Final Office Action for U.S. Appl. No. 14/703,867 dated Jun. 16, 2017.
Final Office Action for U.S. Appl. No. 14/703,867 dated May 20, 2016.
Non-Final Office Action for U.S. Appl. No. 14/703,867 dated Nov. 16, 2017.
Non-Final Office Action for U.S. Appl. No. 14/703,867 dated Oct. 21, 2016.
Non-Final Office Action for U.S. Appl. No. 14/703,867 dated Jul. 6, 2015.
Amendment Response to NFOA for U.S. Appl. No. 14/703,867 dated Feb. 15, 2018.
Amendment Response to NFOA for U.S. Appl. No. 14/703,867 dated Feb. 21, 2017.
Amendment Response to NFOA for U.S. Appl. No. 14/703,867 dated Jan. 6, 2016.
Amendment Response to FOA for U.S. Appl. No. 14/703,867 dated Aug. 16, 2017.
Amendment Response to FOA for U.S. Appl. No. 14/703,867 dated Oct. 5, 2016.
Notice of Allowance for U.S. Appl. No. 14/703,867 dated Jul. 10, 2018.
Request for Reexamination of U.S. Pat. No. 10,234,939 dated Feb. 14, 2022.
Declaration of Dr. Doug Bowman Under 37 C.F.R. § 1.132 including Appendix A (List of Materials Considered) and Appendix B (Curriculum Vitae), dated Feb. 10, 2022.
Minatani, S., et al., "Face-to-Face Tabletop Remote Collaboration in Mixed Reality," IEEE and ACM International Symposium on Mixed and Augmented Reality, Nov. 2007.
Kitamura, Y., et al., "Distributed Processing Architecture for Virtual Space Teleconferencing," IEICE Transactions on Communications, E78(7):970-979, Jul. 1995.
Maimone, A., et al., "Augmented Reality Telepresence with 3D Scanning and Optical See-Through HMDs," Nov. 7, 2012, accessed at https://www.youtube.com/watch?v=NziOsm81tP4.
Paul Milgram & Fumio Kishino, "A Taxonomy of Mixed Reality Visual Displays," E77-D IEICE Transactions on Information & Systems 1321 (1994).
Azuma, Ronald T., "A Survey of Augmented Reality," Teleoperators and Virtual Environments 355-385 (1997).
Benford, S., et al., "Understanding and Constructing Shared Spaces with Mixed-Reality Boundaries," ACM Transactions on Computer-Human Interaction, vol. 5, No. 3 (1998).
Billinghurst, M., et al., "The MagicBook: A Transitional AR Interface," Computers & Graphics 25,745-53 (2001).
Carmigniani, J., et al., "Augmented Reality Technologies, Systems and Applications," Multimedia tools Applications 51, 341-77 (2011).
Schmalstieg, D., et al., "The Studierstube Augmented Reality Project," Presence, vol. 11, No. 1, 33-54 (2002).
Stoykova, E., et al., "3-D Time-Varying Scene Capture Technologies- A Survey," IEEE Transactions on Circuits and Systems for video Technology, vol. 17, No. 11 {2007).
Yang, R., et al., "Real-Time Consensus-Based Scene Reconstruction using Commodity Graphics Hardware," 10th Pacific Conference on Computer Graphics and Applications, vol. 22, No. 2 (2002).
Izadi, S., et al., "KinectFusion: Real-time 3D Reconstruction and Interaction Using a Moving Depth Camera," Proceedings of the 24th annual ACM symposium on User interface software and technology, 559-68 (2011).
Bower, M., et al., "Blended reality: Issues and potentials in combining virtual worlds and face-to-face classes," Proceedings ascilite Sydney (2010).

Hoshi, K., et al., "Tools, Perspectives and Avatars in Blended Reality Space," Studies in Health Technology and Informatics, 144, 91-95 (2009).
Decision Granting Request for Ex Parte Reexamination for U.S. Appl. No. 90/014,957 dated Mar. 10, 2022.
Butime, J., et al., "3D Reconstruction Methods, A Survey," Proceedings of the First International Conference on Computer Vision Theory and Applications, pp. 457-463 (2006).
Sterling, B., "Augmented Reality: RjD" Wired, accessed at https://www.wired.com/2009/08/augmented-reality-rjdj/ (Aug. 2009).
Request for Reexamination of U.S. Pat. No. 10,068,374 dated Mar. 11, 2022.
Declaration of Douglas A. Bowman, Ph.D. under 37 C.F.R. 1.312, Materials Considered, and C/V dated Mar. 11, 2022.
Claim Chart 1 for U.S. Pat. No. 10,234,939 dated Feb. 14, 2022.
Claim Chart 2 for U.S. Pat. No. 10,234,939 dated Feb. 14, 2022.
Claim Chart 3 for U.S. Pat. No. 10,234,939 dated Feb. 14, 2022.
Claim Chart 4 for U.S. Pat. No. 10,234,939 dated Feb. 14, 2022.
Claim Chart 5 for U.S. Pat. No. 10,234,939 dated Feb. 14, 2022.
Claim Chart 6 for U.S. Pat. No. 10,234,939 dated Feb. 14, 2022.
Claim Chart 7 for U.S. Pat. No. 10,234,939 dated Feb. 14, 2022.
Claim Chart 1 for U.S. Pat. No. 10,068,374 dated Mar. 11, 2022.
Claim Chart 2 for U.S. Pat. No. 10,068,374 dated Mar. 11, 2022.
Claim Chart 3 for U.S. Pat. No. 10,068,374 dated Mar. 11, 2022.
Claim Chart 4 for U.S. Pat. No. 10,068,374 dated Mar. 11, 2022.
Claim Chart 5 for U.S. Pat. No. 10,068,374 dated Mar. 11, 2022.
Claim Chart 6 for U.S. Pat. No. 10,068,374 dated Mar. 11, 2022.
Claim Chart 7 for U.S. Pat. No. 10,068,374 dated Mar. 11, 2022.
Claim Chart 8 for U.S. Pat. No. 10,068,374 dated Mar. 11, 2022.
Claim Chart 9 for U.S. Pat. No. 10,068,374 dated Mar. 11, 2022.
Claim Chart 10 for U.S. Pat. No. 10,068,374 dated Mar. 11, 2022.
Claim Chart 11 for U.S. Pat. No. 10,068,374 dated Mar. 11, 2022.
Claim Chart 12 for U.S. Pat. No. 10,068,374 dated Mar. 11, 2022.
Claim Chart 13 for U.S. Pat. No. 10,068,374 dated Mar. 11, 2022.
Claim Chart 14 for U.S. Pat. No. 10,068,374 dated Mar. 11, 2022.
Claim Chart 15 for U.S. Pat. No. 10,068,374 dated Mar. 11, 2022.
Claim Chart 16 for U.S. Pat. No. 10,068,374 dated Mar. 11, 2022.
Request for Reexamination of U.S. Pat. No. 10,282,907 dated Apr. 8, 2022.
Declaration of Dr. Doug Bowman Under 37 C.F.R. § 1.132 including Appendix A (List of Materials Considered) and Appendix B (Curriculum Vitae) and Incorporated Claim Charts CC-1 to CC-9 dated Apr. 8, 2022.
Fischer, J., et al., "Measuring the Discernability of Virtual Objects in Conventional and Stylized Augmented Reality," Eurographics Symposium on Virtual Environments, 2006.
Mann, S., et al., "VideoOrbits on Eye Tap devices for deliberately Diminished Reality or altering the visual perception of rigid planar patches of a real world scene," Presence: Teleoperators and Virtual Environments, 11(2):158-175, Apr. 2002.
Milgram, P. and Kishino, F., "A Taxonomy of Mixed Reality Visual Displays," IEICE Transactions on Information and Systems, E77-D(12):1321-1329, Dec. 1994.
Azuma, R., "A Survey of Augmented Reality," Presence: Teleoperators and Virtual Environments, 6(4):355-385, Aug. 1997.
Benford, S., et al., "Understanding and Constructing Shared Spaces with Mixed-Reality Boundaries," ACM Transactions on Computer-Human Interaction, 5(3):185-223, Sep. 1998.
Billinghurst, M., et al., "The MagicBook: a transitional AR interface," Computers & Graphics, 25(5):745-753, Oct. 2001.
Bower, M., et al., "Blended reality: Issues and potentials in combining virtual worlds and face-to-face classes," Ascilite 2010 Sydney, Jan. 2010 ("Blended Reality").
Butime, J., et al., "3D Reconstruction Methods, A Survey," Proceedings of the First International Conference on Computer Vision Theory and Applications, pp. 457-463, 2006 "3D Reconstruction Methods").
Carmigniani, J., et al., "Augmented reality technologies, systems and applications," Multimedia Tools and Applications, 51(1):341-377, Dec. 2010.

(56) References Cited

OTHER PUBLICATIONS

Feiner, S., "The Importance of Being Mobile: Some Social Consequences of Wearable Augmented Reality Systems," Proceedings 2nd IEEE and ACM International Workshop on Augmented Reality (IWAR'99), Oct. 1999.
File History of U.S. Pat. No. 10,282,907.
Hoshi, K et al., "Tools, Perspectives and Avatars in Blended Reality Space," Studies in Health Technology and Informatics, 144(1):91-5, Feb. 2009 ("Tools, Perspectives and Avatars in Blended Reality Space").
Izadi, S., et al., "KinectFusion: Real-time 3D Reconstruction and Interaction Using a Moving Depth Camera," Proceedings of the 24th annual ACM symposium on User Interface Software and Technology, Oct. 2011 ("KinectFusion").
Schmalstieg, D., et al., "The Studierstube Augmented Reality Project," DBLP, 11 (1):333-54, Feb. 2002 ("Studierstube Augmented Reality Project").
Sterling, B., "Augmented Reality: RjDj," Wired (2012) ("RjDj").
Stoykova, E., et al., "3-D Time-Varying Scene Capture Technologies—A Survey," IEEE Transactions on Circuits and Systems for Video Technology, 17(11):1568-1586, Nov. 2007 ("3-D Time-Varying Scene Capture Technologies").
"Wrap 920AR," Vuzix, accessed on Dec. 15, 2021, accessed at https://web.archive.org/web/20101230162338/http://www.vuzix.com/ar/products_wrap920ar.html#features.
Yang, R., et al., "Real-Time Consensus-Based Scene Reconstruction using Commodity Graphics Hardware," 10th Pacific Conference on Computer Graphics and Applications, 22(2):225-234, Feb. 2002 ("Real-Time Reconstruction").
Order Granting Request For Ex Parte ReExamination for U.S. Pat. No. 10,068,374 dated May 2, 2022.
Order Granting Request For Ex Parte ReExamination for U.S. Pat. No. 10,282,907 dated May 12, 2022.
Examiner Interview of U.S. Pat. No. 10,282,907 dated Apr. 14, 2022.
Office Action in Ex Parte Reexamination for U.S. Appl. No. 90/014,957 dated Jul. 5, 2022.
Examiner Interview of U.S. Pat. No. 10,234,939 dated Feb. 23, 2022.
Office Action in Ex Parte Reexamination for U.S. Appl. No. 90/014,974 dated Sep. 16, 2022.
Office Action in Ex Parte Reexamination for U.S. Appl. No. 90/014,999 dated Sep. 21, 2022.
Timo Koskela et al: "Hybrid avatars", WEB3D Technology, ACM, 2 Penn Plaza, Suite 701 New York NY 10121-0701 USA, Jul. 22, 2016 (Jul. 22, 2016), pp. 69-72, XP058277330, DOI: 10.1145/2945292.2945308, ISBN: 978-1-4503-4428-9 *p. 69, right-hand column, paragraphs 3,4; figure 1* *p. 70, left-hand column * *p. 71, left-hand column, paragraph 3-6*.
Shi Yangming et al: "A Multiuser Shared Virtual Environment for Facility Management", Procedia Engineering, Elsevier BV, NL, vol. 145, May 20, 2016 (May 20, 2016), pp. 120-127, XP029544531, ISSN: 1877-7058, DOI: 10.1016/J.PROENG.2016.04.029 *abstract* *p. 121, paragraph 3*.
Extended European Search Report for EP Patent Appln. No. 20852187.2 dated Sep. 15, 2022.

\* cited by examiner

SYSTEMS AND METHODS FOR VIRTUAL AND AUGMENTED REALITY

The present application claims priority to U.S. Provisional Patent Application Ser. No. 62/885,794, filed on Aug. 12, 2019, and entitled "SYSTEMS AND METHODS FOR VIRTUAL AND AUGMENTED REALITY," the contents of which are fully incorporated herein by reference as though set forth in full.

FIELD OF THE INVENTION

This invention is related to connected mobile computing systems, methods, and configurations, and more specifically to mobile computing systems, methods, and configurations featuring at least one wearable component which may be utilized for virtual and/or augmented reality operation.

BACKGROUND

Figure 1:
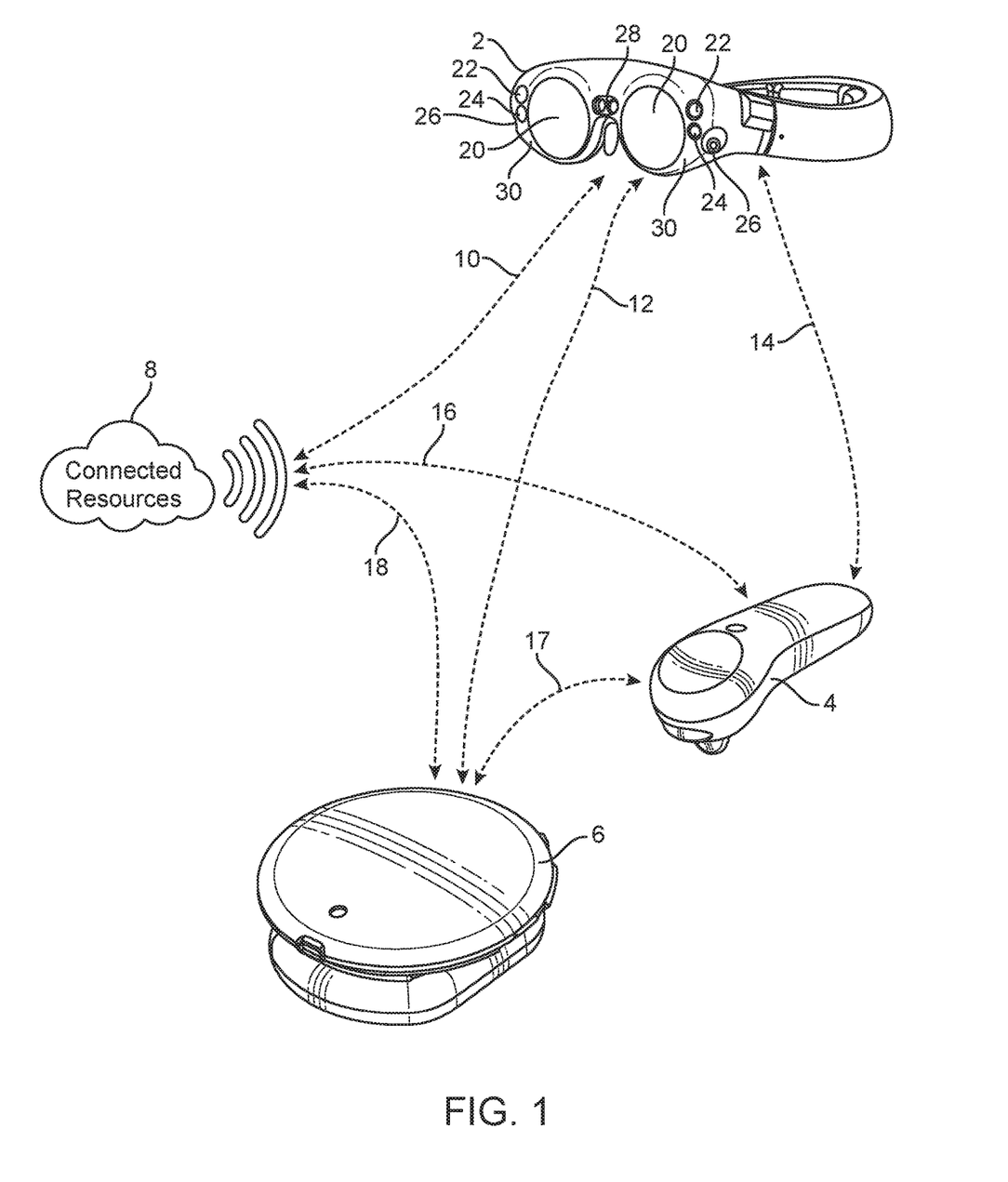
FIG. 1 schematically depicts an augmented reality system according to some embodiments.

It is desirable that mixed reality, or augmented reality, near-eye displays be lightweight, low-cost, have a small form-factor, have a wide virtual image field of view, and be as transparent as possible. In addition, it is desirable to have configurations that present virtual image information in multiple focal planes (for example, two or more) in order to be practical for a wide variety of use-cases without exceeding an acceptable allowance for vergence-accommodation mismatch. Referring to FIG. 1, an augmented reality system is illustrated featuring a head-worn viewing component (2), a hand-held controller component (4), and an interconnected auxiliary computing or controller component (6) which may be configured to be worn as a belt pack or the like on the user. Each of these components may be operatively coupled (10, 12, 14, 16, 17, 18) to each other and to other connected resources (8) such as cloud computing or cloud storage resources via wired or wireless communication configurations, such as those specified by IEEE 802.11, Bluetooth®, and other connectivity standards and configurations. As described, for example, in U.S. patent application Ser. Nos. 14/555,585, 14/690,401, 14/331,218, 15/481,255, 62/627,155, 62/518,539, 16/229,532, 16/155,564, 15/413,284, 16/020,541, 62/702,322, 62/206,765, 15/597,694, 16/221,065, 15/968,673, and 62/682,788, each of which is incorporated by reference herein in its entirety, various aspects of such components are described, such as various embodiments of the two depicted optical elements (20) through which the user may see the world around them along with visual components which may be produced by the associated system components, for an augmented reality experience. As illustrated in FIG. 1, such a system may also comprise various sensors configured to provide information pertaining to the environment around the user, including but not limited to various camera type sensors and/or emitters (such as monochrome, color/RGB, infrared, and/or thermal) (22, 24, 26), depth camera sensors (28), and/or sound sensors (30) such as microphones. There is a need for compact and persistently connected wearable computing systems and assemblies such as those described herein, which may be utilized to provide a user with the perception of rich augmented reality experiences, including but not limited to experiences related to certain aspects of the natural world, such as aspects of the many configurations of the modern enterprise working environment world.

SUMMARY

Embodiments are directed to connected mobile computing systems, methods, and configurations. In particular, embodiments are to mobile computing systems, methods, and configurations featuring at least one wearable component which may be utilized for virtual and/or augmented reality operation.

In one embodiment, a computer implemented method of facilitating communication between first and second users includes displaying, by a first head-worn device, a first virtual object to the first user first user wearing the first head-worn device. The method also includes displaying, by a second head-worn device, a second virtual object to the second user wearing the second head-worn device. The method further includes facilitating, by the first and second head-worn devices, communications between the first and second users using the first and second virtual objects to simulate the first and second users being present in a common environment.

In one or more embodiments, the first virtual object is an avatar of the second user. The second virtual object may be an avatar of the first user. The method may include sending, by a first processor, the second virtual object to the second head-word device. The method may include sending, by a second processor, the first virtual object to the first head-word device.

In another embodiment, a computer implemented method of sharing a virtual experience includes displaying, by a first head-worn device, a virtual object to a first user wearing the first head-worn device. The method also includes displaying, by a second head-worn device, the virtual object to a second user wearing the second head-worn device. The method further includes facilitating, by the first and second head-worn devices, communications between the first user and a second user relating to the virtual object.

In one or more embodiments, the first user is located at a first geographic location, and the second user is located in a second geographic location different from the first geographic location. The method may include modifying, by the first user, the virtual object. The method may include modifying, by the second user, the virtual object. The method may include communicating, by the first and second head-worn devices, modifications to the virtual object between the first and second head-worn devices. The first and second head-worn devices may be communicatively coupled by a network.

In one or more embodiments, the method includes providing, by the first user via a first user interface device operatively coupled to the first head-worn device, input relating to the virtual object. The first user interface device may be selected from the group consisting of a haptic interface device, a keyboard, a mouse, a joystick, a motion capture controller, an optical tracking device, and an audio input device. The method may include providing, by the second user via a second user interface device operatively coupled to the second head-worn device, input relating to the virtual object. The second user interface device may be selected from the group consisting of a haptic interface device, a keyboard, a mouse, a joystick, a motion capture controller, an optical tracking device, and an audio input device.

In one or more embodiments, the method includes providing, by a sensor operatively coupled to the first and second head-worn device, input relating to the virtual object. The sensor may be selected from the group consisting of a camera and an optical detection device. The sensor may be outward facing. The sensor may be inward facing toward a user. The method may also include projecting, by the sensor, infrared structured light. The input may be selected from the group consisting of pupil size, pupil position, pupil angle, eye spherocity, eye shape, figure motion, and anatomic data relating to a user. The method may include determining, by a processor, a user's visual focal point using the input. The method may include mapping, by a processor, a portion of a user's environment using the input.

In one or more embodiments, the method includes providing, by an environmental sensor operatively coupled to the first and second head-worn devices, environmental input relating to a geographical location. The environmental sensor may be selected from the group consisting of a camera, an optical detection device, a motion capture device, a depth measurement device, a facial recognition device, an object recognition device, an audio recognition device, a CMOS sensor, a field-of-view sensor, and an optical-enhancing sensor. The environmental input may be selected from the group consisting of motion capture data, gesture recognition date, depth sensing data, facial recognition data, object recognition data, unique object feature recognition data, audio recognition data, voice recognition data, acoustic source localization data, noise reduction data, infrared light data, laser light data, CMOS sensor data, field-of-view data, and optical-enhancing data.

In one or more embodiments, the virtual object corresponds to a Computer Aided Design file. The virtual object may correspond to a Building-Information-Modeling system configuration. The virtual object may be a building, and the first and second head-worn devices may be configured to display a virtual tour of the building to the first and second users, respectively. The virtual object may be a three dimensional drawing of a manufactured object. The manufactured object may be a component of an automobile.

In one or more embodiments, the virtual object is related to an educational experience. The virtual object may be selected from the group consisting of a laboratory object, an object from the library, a three dimensional video, a science model, and a natural phenomenon. The first and second head-worn devices may be configured to facilitate a one-on-one educational experience between the first and second users. The first and second head-worn devices may be configured to facilitate a one-to-many educational experience.

In still another embodiment, a computer implemented method of sharing a real-world experience includes capturing, by a first head-worn device, an image of the real-world object in an environment of a first user wearing the first head-worn device. The method also includes generating, by a processor, a virtual object based on the image of the real-world object. The method further includes displaying, by a second head-worn device, the virtual object to a second user wearing the second head-worn device. Moreover, the method includes facilitating, by the first and second head-worn devices, communications between the first user and a second user relating to the real-world object.

In one or more embodiments, the first user is located at a first geographic location, and the second user is located in a second geographic location different from the first geographic location. The virtual object may correspond to the real-world object. The method also includes generating, by the processor, a mesh or a point cloud based on the image of the real-world. The second head-worn device may be configured to allow the second user to modify the virtual object. The first head-worn device may be configured to display a first virtual object to the first user based on the second user modifying the virtual object. The first and second head-worn devices may be configured to communicate modifications to the virtual object between the first and second head-worn devices. The first and second head-worn devices may be communicatively coupled by a network.

In one or more embodiments, the first and second head-worn devices and the processor are configured to display a view of the virtual object to the second user substantially the same as the view of the real-world object to the first user. The second user may have expertise relating to the real-world object. The second user may have access to information about the real-world object.

In one or more embodiments, the method includes sensing, by the first head-worn device, a texture of the real-world object. The method may also include generating, by the processor, a texture of the virtual object based on the texture of the real-world object. The method may further include displaying, by the second head-worn device, the texture of the virtual object to the second user.

In one or more embodiments, the method includes detecting, by a vibration sensor operatively coupled to the first head-worn device, a vibration relating to the real-world object. The method may also include generating, by the processor, a vibration relating to the virtual object based on the vibration relating to the real-world object. The method may further include providing, by a haptic interface device operatively coupled to the second head-worn device, the vibration relating to the virtual object to the second user.

In one or more embodiments, the method includes detecting, by an olfactory sensor operatively coupled to the first head-worn device, a smell relating to the real-world object. The method may also include generating, by the processor, a smell relating to the virtual object based on the smell relating to the real-world object. The method may further include providing, by an olfactory interface device operatively coupled to the second head-worn device, the smell relating to the virtual object to the second user.

In one or more embodiments, the real-world object and the virtual object both relate to a medical procedure at the first geographical location. The communications between the first and second users relating to the virtual object may facilitate performance of the medical procedure by the first user. The medical procedure may be selected from the group consisting of a surgical procedure, diagnosing a patient, and a field medical procedure.

In one or more embodiments, the real-world object and the virtual object both relate to an emergency incident at the first geographical location. The second user may have access information about the first geographical location. The information about the first geographical location may be selected from the group consisting of a CAD drawing of the geographical location, a summary of gas and electrical architecture at the geographical location, and camera information at the geographical location. The second head-worn device may be configured to facilitate the second user modifying the first geographical location. The first geographical location may include a building that is on fire. The communications between the first user and a second user relating to the real-world object may include eye tracking information for the first user or the second user.

In one or more embodiments, the real-world object and the virtual object both relate to a retail transaction at the first geographical location. The retail transaction may be selected from the group consisting of tracking inventory, managing inventory, sales training, managing security scenario, facilitating a return transaction, and assisting a customer to select merchandise.

In one or more embodiments, the real-world object and the virtual object both relate to an entertainment experience. The first and second head-worn devices may be configured to facilitate immersive news coverage. The first and second head-worn devices may be configured to facilitate entertainment incorporating an element from the first geographical location of the first user. The method may include displaying, by the first head-worn device, a generated virtual object to the first user, and the virtual object may be related to the real-world object. The generated virtual object may be selected from the group consisting of text and an audio-visual clip. The method may include receiving, by the first head-worn device, user input from the first user indicating the real-world object. The method may include displaying, the first head-worn device, the generated virtual object to the first user in response to receiving the user input from the first user indicating the real-world object. The user input may be selected from the group consisting of a user gaze, a user gesture, and a user manipulation of a controller operatively coupled to the first head-worn device.

The aforementioned and other embodiments of the invention are described in the Detailed Description which follows.

BRIEF DESCRIPTION OF THE DRAWINGS

The foregoing and other aspects of embodiments are described in further detail with reference to the accompanying drawings, in which the same elements in different figures are referred to by common reference numerals, wherein.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

In various embodiments a user may be wearing an augmented reality system such as that depicted in FIG. 1, which may also be termed a "spatial computing" system in relation to such system's interaction with the three dimensional world around the user when operated. Such a system may comprise, for example, a head wearable display component (2), and may feature environmental sensing capabilities as described above and in the aforementioned incorporated by reference materials, such as cameras of various types which may be configured to map the environment around the user, or to create a "mesh" or "point cloud" pertaining to such environment. Spatial computing systems, including but not limited to systems that provide augmented reality (AR), virtual reality (VR), and/or mixed reality (MR) display functionality, may be employed to facilitate various activities. For example, spatial computing systems can improve efficiency of communication and collaboration for activities that involve the interaction of multiple individuals, including individuals who may be geographically remote from one another.

Embodiments provide for the use of spatial computing systems to facilitate (e.g., interpersonal) activities in a variety of domains, including domains such as different industries that involve various types of business activities. Such domains can include, but are not limited to, one or more of the following: Architecture, Engineering and Construction (AEC), Manufacturing, Automotive, Healthcare, Financial Services, Retail, Media/Entertainment/Sports, Energy and Utilities, Education, General Business, Travel/Tourism/Hospitality, Agencies (e.g., development houses), Government, Non-Profit, and/or Telecommunications. For example, embodiments provide for business without barriers, e.g., shake hands across cities, train teams across time zones, reinvent the way people do business, and so forth. For example, from bringing architectural drawings to life, to transforming production and fulfillment operations, embodiments provide techniques through which spatial computing can revolutionize different types of work.

Examples in Architecture, Engineering, and Construction

Close the gap between designing and building. A spatial computing system can bring computer aided design files ("CADs") and building information building-information-modelling system configurations ("BIMs") to life so individuals can share sketches in a 3D environment, tweak designs collaboratively, and/or give a virtual tour of a building before it has been built. In other words, in various embodiments, one or more users with systems such as those illustrated in FIG. 1 may collaboratively view certain aspects of building architecture, planning, infrastructure, view simulation, and the like. For example, in one embodiment, an architect wearing a system such as that illustrated in FIG. 1 may conduct a simulated and interactive live tour of a proposed new building project for a financier located in Fiji and also wearing a system such as that illustrated in FIG. 1, with the two users connected by cloud resources (8) such as internet connectivity, storage, and compute resources.

Examples in Health and Fitness

A spatial computing system can allow organizations and individuals to explore the future of digital healthcare. Discover new training opportunities for the next generation of professionals and help redefine wellness. Augment how individuals (e.g., surgeons) analyze complex information and 3D images. For example, in various embodiments, one user of a system such as that illustrated in FIG. 1 may collaborate with another user of a similar system, each of which may be connected via cloud resources (8), in an "expert on board" or "colleague on board" type of configuration, such that a second user may be able to visualize the activity of a first user, as though the second user is looking over the shoulder of the first user (but even better—the second user can literally have the same view as the first user, and may share audio as well and be able to confidentially and securely communicate with the first user). In one embodiment, an expert surgeon may be virtually "called in" to assist a more experienced field medic in a wartime injury scenario using an "expert on board"; the expert surgeon may be able to assist in diagnosing the patient scenario, directing the field medic what to do, what to examine, how to locate certain anatomy, etc. In other embodiments, remote experts with access to different computing resources and information may assist local resources, such as in a fire and rescue scenario wherein local firefighters wearing connected (8) systems such as that illustrated in FIG. 1, may be assisted in an "expert on board" type of fast-paced scenario wherein the local expert has access to CAD drawings of the building on fire, access to remote locking/unlocking systems, and understanding of gas and electrical architecture through connected computing resources which may be most easily and efficiently accessed by the remote expert using a large computer workstation with a fast keyboard and large flat monitor; in other words, the remote expert can conveniently and quickly utilize these resources which are preferably accessed by the remote expert in a control station environment, but such information may be shared, visualized, and utilized through a combination of audio and visual information sharing through the spatial computing connectivity shared by the users. The remote expert can literally be saying things like "gas line behind that small purple wall to your right, watch out; take the axe straight ahead through that white wall—yes, right where you are gazing . . . ; next room is where we believe the trapped personnel are located, and we have 'eyes on' information from local internet-of-things camera with infrared that they are in there, on the ground underneath a table . . . ".

Examples in Manufacturing

A spatial computing system can revolutionize the manufacturing process by letting designers create and collaborate in real time, boosting productivity in the automotive industry and in other industries. For example, in various embodiments, a plurality of users wearing connected (8) systems such as those illustrated in FIG. 1 may be able to work together and visualize/hear each other from different locations in a manner which is akin to being in the same room next to each other. They can share ideas, assist each other, and work in "expert on board" or "colleague on board" scenarios similar to those described above; they can dissect and examine three dimensional drawings, they can assist each other in examining three dimensional objects, such as engine or car assembly components, and the like.

Examples in Retail

A spatial computing system can be used to transform the physical stores of today into the immersive customer experiences of tomorrow. Allow associates in different cities to track and manage inventory and run remote training. For example, in various embodiments, users in different locations with connected (8) systems may collaborate together as though they are on the same retail floor or in the same inventory warehouse; they may assist each other in "expert on board" or "colleague on board" types of configurations, such as what do to in urgent security scenarios, training experiences or all sorts, how to handle a customer retail return without adequate documentation, or how to assist a customer in selecting a very specific type of clothing where a remote expert may be "brought in" using the system to assist a local associate who may have less experience or less particular knowledge on point.

Examples in Education

A spatial computing system can be used to turn a (e.g., chemistry) classroom into an immersive learning experience. Integrate labs and libraries into spatial learning and provide new ways to collaborate and interact. Teachers and students wearing connected systems such as that illustrated in FIG. 1 may visualize and hear audio pertaining to amazing three dimensional videos of objects such as organic chemistry diagrams, volcanos, or whatever subject of relevance; they also may "share" a classroom even when they are not actually residing in the same classroom. Further, a remote teacher may quietly assist one particular student in a new form of "specialized education" wherein the remote teacher assists the local student in an "expert on board" type of scenario.

Examples in Media and Entertainment

A spatial computing system can provide immersive news coverage and location-based entertainment, creating a new way for visionary storytellers to connect with their audiences and develop content. For example, in various embodiments, users of connected (8) systems such as that illustrated in FIG. 1 may be able to walk through a park and receive media information pertaining to various things relevant to their location and gaze; for example, if a user is gazing at a particular flower and has her system configured to provide additional media if she presents a "thumbs up" gesture in front of her face near the flower (or, for example, to use one of the selection devices associated with the hand-held controller 4), the system may be configured to provide readable information pertaining to the flower—what type it is (by pattern recognition, for example), what it is known for, popular culture uses of the flower, etc., in accordance with the user's preferences. Indeed, the user may wish to view some movie clips pertaining to use of such flower, or even have a botanist "brought in" in an "expert on board" type of configuration; or to even bring in her husband by using his connected (8) system from his remote location, so that he can see what she is seeing or be "present" there in a simulated fashion, to experience the scenario with her.

Illustrative Embodiment(s)

Figure 2:
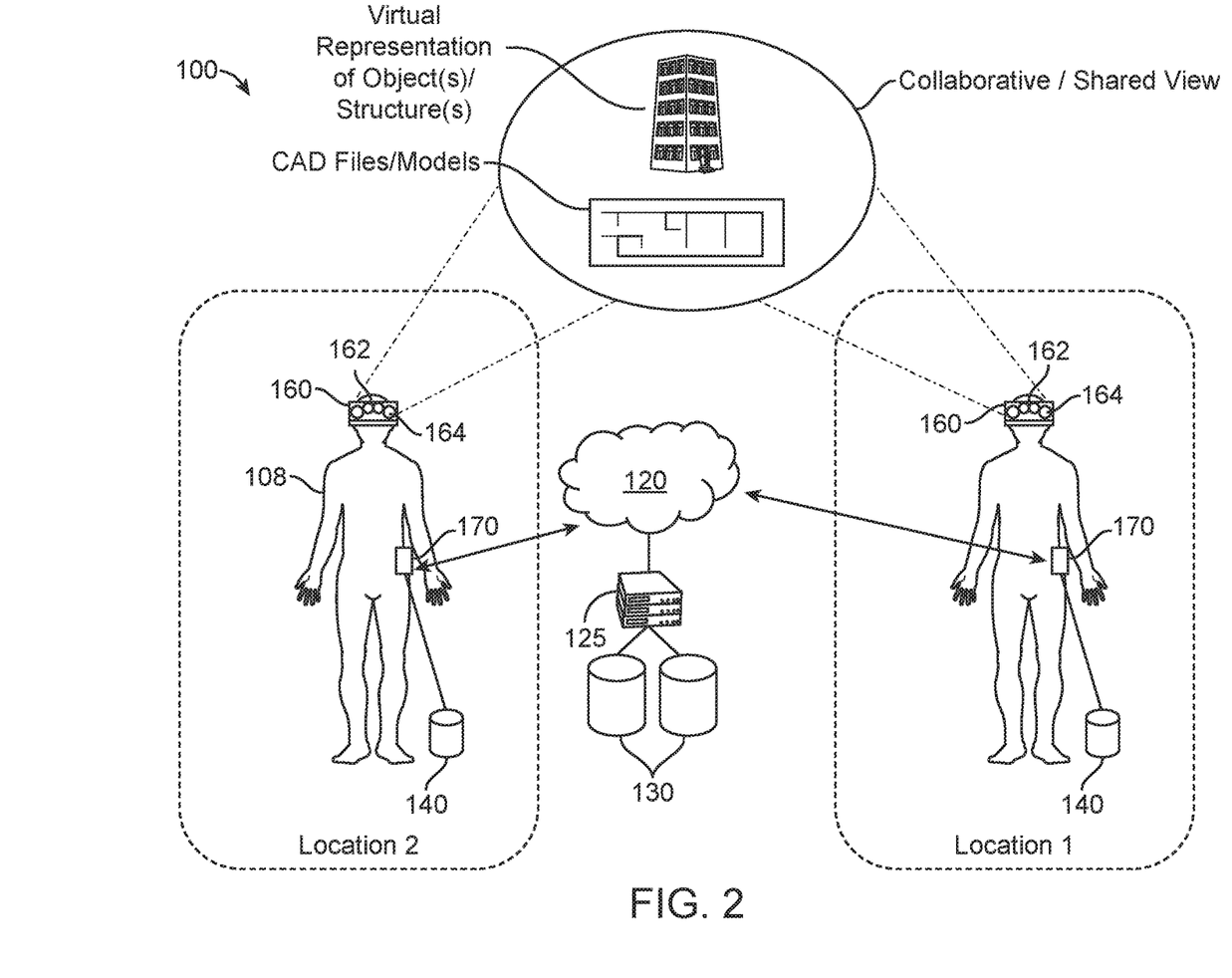
FIG. 2 schematically depicts a spatial computing system that allows multiple users to collaboratively view and/or manipulate virtual objects/images according to some embodiments.

FIG. 2 provides an illustration according to one or more embodiments. Here, the computing environment allows multiple users to collaboratively view and/or manipulate virtual objects/images. For example, as noted above, the spatial computing system can bring computer aided design files ("CADs") and building information building-information-modelling system configurations ("BIMs") to life so individuals can share sketches in a 3D environment, tweak designs collaboratively, and/or give a virtual tour of a building before it has been built, e.g., as shown in FIG. 2 where a user at location 1 is able to collaboratively view CAD files/models and/or virtual objects/structures with another user at location 2. The visual presentation is displayed in a spatially organized 3D and/or 2D environment.

Figure 3:
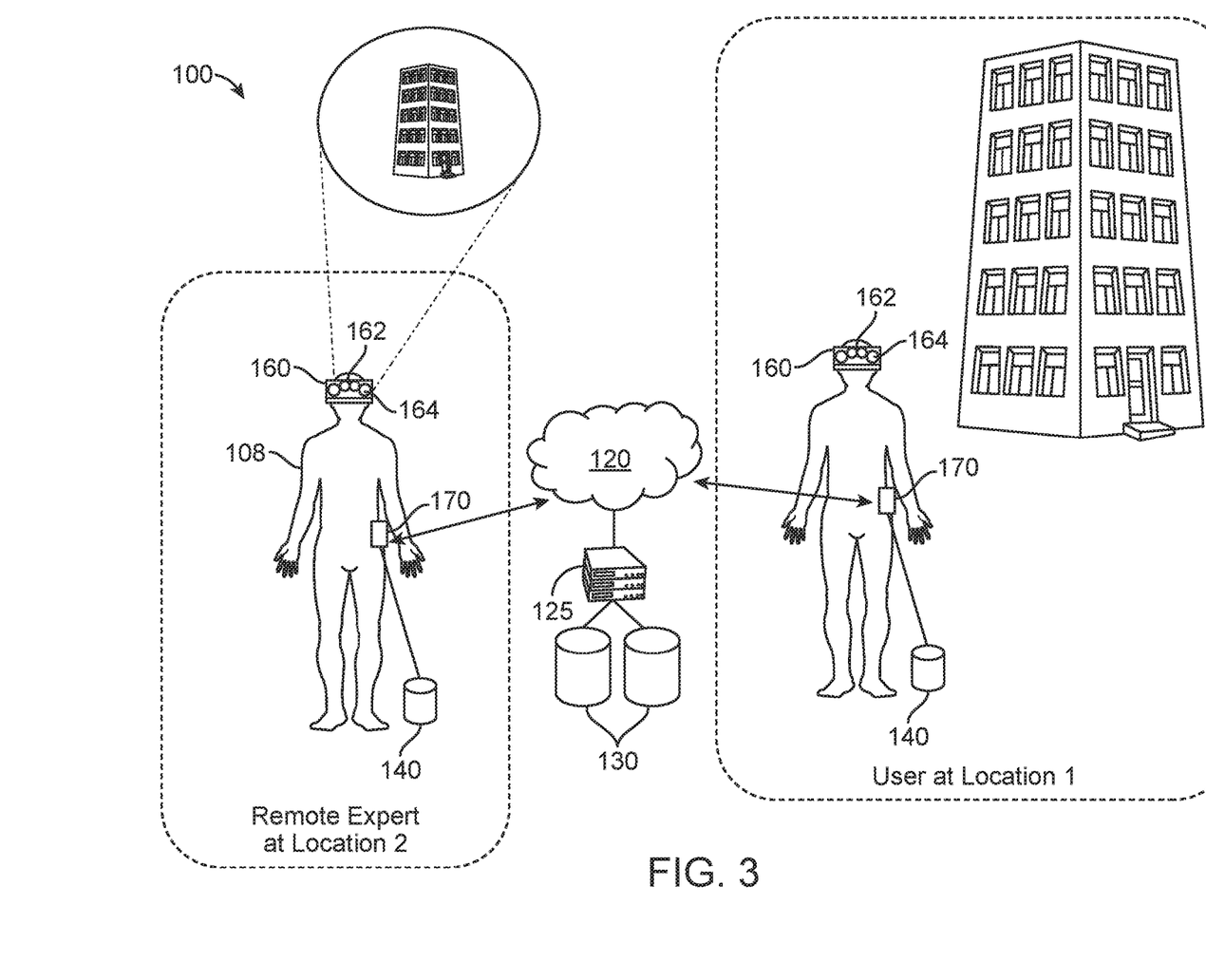
FIG. 3 schematically depicts a spatial computing system that allows a remote user to collaborate with a local user according to some embodiments.

As illustrated in FIG. 3, a spatial computing system can allow a remote expert to become an "expert on board" for any suitable situation or application. For example, in various embodiments, one user of a system such as that illustrated in may collaborate with another user of a similar system, each of which may be connected via networked resources, where one of the users is an "expert on board" or "colleague on board". The second user may be able to visualize the activity of the first user—from the exact perspective of the first user or as though the second user is looking over the shoulder of the first user. Other forms of media may also be shared, e.g., audio, texture, vibrations, smell, etc., depending upon the specific types of sensors and/or interfaces that are implemented within the system/devices.

Environment 100 in FIGS. 2 and 3 is representative of a physical environment and systems for implementing various processes described herein. The representative physical environment and system of the environment 100 includes a user's physical environment as viewed by a user 108 through a head-mounted system 160. The representative system of the environment 100 further includes accessing 2D content via a system operably coupled to a network 120. The network 120 may be the Internet, an internal network, a private cloud network, a public cloud network, etc. The system is also operably coupled to a processor 170 via the network 120. Although the processor 170 is shown as an isolated component separate from the head-mounted system 160, in an alternate embodiment, the processor 170 may be integrated with one or more components of the head-mounted system 160, and/or may be integrated into other system components within the environment 100 such as, for example, the network 120 to access a computing network 125 and storage devices 130. The processor 170 may be configured with software for receiving and processing information such as video, audio and content received from the head-mounted system 160, a local storage device 140, the computing network 125, and the storage devices 130. The software may communicate with the computing network 125 and the storage devices 130 via the network 120. The software may be installed on the processor 170 or, in another embodiment; the features and functionalities of software may be integrated into the processor 170. The processor 170 may also be configured with the local storage device 140 for storing information used by the processor 170 for quick access without relying on information stored remotely on an external storage device from a vicinity of the user 108. In other embodiments, the processor 170 may be integrated within the head-mounted system 160.

The user's physical environment is the physical surroundings of the user 108 as the user moves about and views the user's physical environment through the head-mounted system 160. The computing network 125 accesses the storage devices 130 to retrieve and store content for display. In some embodiments, the local storage device 140 may provide content of interest to the user 108. The local storage device 140 may include, for example, a flash drive, a cache, a hard drive, a database, a file system, etc. Information stored in the local storage device 140 may include recently accessed content or recently displayed content. The local storage device 140 allows improvements in performance to the systems of the environment 100 by providing certain content locally to the software.

The software includes software programs stored within a non-transitory computer readable medium to perform the functions of deconstructing 2D content to be displayed within the user's physical environment 105. The software may run on the processor 170 wherein the processor 170 may be locally attached to the user 108, or in some other embodiments, the software 150 and the processor 170 may be included within the head-mounted system 160. In some embodiments, portions of the features and functions of the software 150 may be stored and executed on the computing network 125 remote from the user 108.

The head-mounted system 160 may be a virtual reality (VR) or augmented reality (AR) head-mounted system that includes a user interface, a user-sensing system, an environment sensing system, and a processor (all not shown). The head-mounted system 160 presents to the user 108 an interface for interacting with and experiencing a digital world. Such interaction may involve the user and the digital world, one or more other users interfacing the environment 100, and objects within the digital and physical world.

The user interface for the system may include at least one or a combination of a haptics interface devices, a keyboard, a mouse, a joystick, a motion capture controller, an optical tracking device and an audio input device. A haptics interface device is a device that allows a human to interact with a computer through bodily sensations and movements. Haptics refers to a type of human-computer interaction technology that encompasses tactile feedback or other bodily sensations to perform actions or processes on a computing device.

The user-sensing system may include one or more sensors 162 operable to detect certain features, characteristics, or information related to the user 108 wearing the head-mounted system 160. For example, in some embodiments, the sensors 162 may include a camera or optical detection/scanning circuitry capable of detecting real-time optical characteristics/measurements of the user 108 such as, for example, one or more of the following: pupil constriction/dilation, angular measurement/positioning of each pupil, spherocity, eye shape (as eye shape changes over time) and other anatomic data. This data may provide, or be used to calculate information (e.g., the user's visual focal point) that may be used by the head-mounted system 160 to enhance the user's viewing experience.

The environment-sensing system may include one or more sensors 164 for obtaining data from the user's physical environment 105. Objects or information detected by the sensors 164 may be provided as input to the head-mounted system 160. In some embodiments, this input may represent user interaction with the virtual world. For example, a user (e.g., the user 108) viewing a virtual keyboard on a desk (e.g., the table 188) may gesture with their fingers as if the user was typing on the virtual keyboard. The motion of the fingers moving may be captured by the sensors 164 and provided to the head-mounted system 160 as input, wherein the input may be used to change the virtual world or create new virtual objects. The sensors 164 may include, for example, a generally outward-facing camera or a scanner for interpreting scene information, for example, through continuously and/or intermittently projected infrared structured light. The environment-sensing system may be used for mapping one or more elements of the user's physical environment 105 around the user 108 by detecting and registering the local environment, including static objects, dynamic objects, people, gestures and various lighting, atmospheric and acoustic conditions. Thus, in some embodiments, the environment-sensing system may include image-based 3D reconstruction software embedded in a local computing system (e.g., the processor 170) and operable to digitally reconstruct one or more objects or information detected by the sensors 164.

In one embodiment, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS sensors (or other similar sensors), field-of-view sensors, and a variety of other optical-enhancing sensors. It should be appreciated that the environment-sensing system may include other components other than those discussed above.

The processor 170 may, in some embodiments, be integrated with other components of the head-mounted system 160, integrated with other components of system of the environment 100, or may be an isolated device (wearable or separate from the user 108) as shown in FIG. 1. The processor 170 may be connected to various components of the head-mounted system 160 through a physical, wired connection, or through a wireless connection such as, for example, mobile network connections (including cellular telephone and data networks), Wi-Fi, Bluetooth, or any other wireless connection protocol. The processor 170 may include a memory module, integrated and/or additional graphics processing unit, wireless and/or wired internet connectivity, and codec and/or firmware capable of transforming data from a source (e.g., the computing network 125, and the user-sensing system and the environment-sensing system from the head-mounted system 160) into image and audio data, wherein the images/video and audio may be presented to the user 108 via the user interface (not shown).

The processor 170 handles data processing for the various components of the head-mounted system 160 as well as data exchange between the head-mounted system 160 and content displayed or accessed through the computing network 125. For example, the processor 170 may be used to buffer and process data streaming between the user 108 and the computing network 125, thereby enabling a smooth, continuous and high fidelity user experience.

System Architecture Overview

Figure 4:
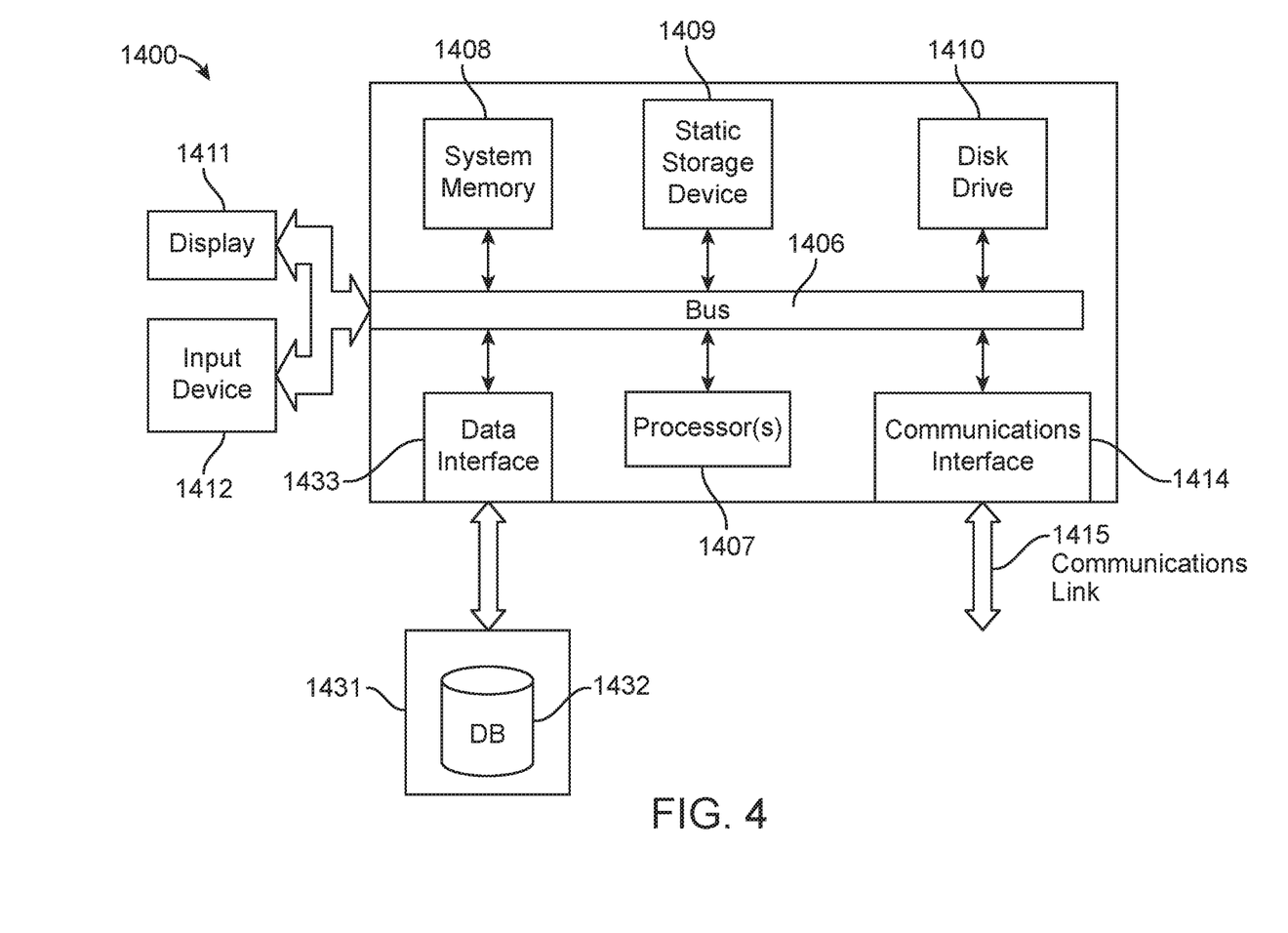
FIG. 4 is a block diagram schematically depicting an illustrative computing system according to some embodiments.

FIG. 4 is a block diagram of an illustrative computing system 1400 suitable for implementing an embodiment of the present disclosure. The computing system 1400 includes a bus 1406 or other communication mechanism for communicating information, which interconnects subsystems and devices, such as a processor 1407, system memory 1408 (e.g., RAM), a static storage device 1409 (e.g., ROM), a disk drive 1410 (e.g., magnetic or optical), a communications interface 1414 (e.g., modem or Ethernet card), a display 1411 (e.g., CRT or LCD), an input device 1412 (e.g., keyboard and mouse).

According to one embodiment of the invention, the computing system 1400 performs specific operations by the processor 1407 executing one or more sequences of one or more instructions contained in the system memory 1408. Such instructions may be read into the system memory 1408 from another computer readable/usable medium, such as the static storage device 1409 or the disk drive 1410. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to the processor 1407 for execution. Such a medium may take many forms, including but not limited to, non-volatile media and volatile media. Non-volatile media includes, for example, optical or magnetic disks, such as the disk drive 1410. Volatile media includes dynamic memory, such as the system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the disclosure, execution of the sequences of instructions to practice the disclosure is performed by a single computing system 1400. According to other embodiments of the disclosure, two or more computing systems 1400 coupled by a communications link 1415 (e.g., LAN, PTSN, or wireless network) may perform the sequence of instructions required to practice the disclosure in coordination with one another.

The computing system 1400 may transmit and receive messages, data, and instructions, including program (i.e., application code) through the communications link 1415 and the communications interface 1414. Received program code may be executed by the processor 1407 as it is received, and/or stored in the disk drive 1410, or other non-volatile storage for later execution. The computing system 1400 may communicate through a data interface 1433 to a database 1432 on an external storage device 1431.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A computer implemented method of sharing a virtual experience involving a real-world object and a virtual object, the method comprising:
    capturing an image of a real-world object from a first user's view of the real-world object by an environmental sensor disposed on a first head-worn device worn by a first user;
    generating a view of a virtual object corresponding to the real-world object from the first user's view of the real-world object, based on the captured image;
    displaying, by the first head-worn device, the view of the virtual object from the first user's view of the real-world object to the first user wearing the first head-worn device; and
    displaying, by a second head-worn device, the view of the virtual object from the first user's view of the real-world object to the second user wearing the second head-worn device; and
    wherein the view of the virtual object to from the first user's view of the real-world object is displayed on both the first head-worn device and second head worn device in real-time with the capturing the image of a real-world object from the first user's view of the real-world object.

2. The method of claim 1, wherein the first user is located at a first geographic location, and
    wherein the second user is located in a second geographic location different from the first geographic location.

3. The method of claim 2, further comprising modifying, by the first user, the virtual object.

4. The method of claim 2, further comprising modifying, by the second user, the virtual object.

5. The method of claim 2, further comprising communicating, by the first and second head-worn devices, modifications to the virtual object between the first and second head-worn devices.

6. The method of claim 2, wherein the first and second head-worn devices are communicatively coupled by a network.

7. The method of claim 2, further comprising providing, by the first user via a first user interface device operatively coupled to the first head-worn device, input relating to the virtual object.

8. The method of claim 7, wherein the first user interface device is selected from the group consisting of a haptic interface device, a keyboard, a mouse, a joystick, a motion capture controller, an optical tracking device, and an audio input device.

9. The method of claim 2, further comprising providing, by the second user via a second user interface device operatively coupled to the second head-worn device, input relating to the virtual object.

10. The method of claim 9, wherein the second user interface device is selected from the group consisting of a haptic interface device, a keyboard, a mouse, a joystick, a motion capture controller, an optical tracking device, and an audio input device.

11. The method of claim 2, further comprising providing, by a sensor operatively coupled to the first and second head-worn device, input relating to the virtual object.

12. The method of claim 11, wherein the sensor is selected from the group consisting of a camera and an optical detection device.

13. The method of claim 11, wherein the input is selected from the group consisting of pupil size, pupil position, pupil angle, eye spherocity, eye shape, figure motion, and anatomic data relating to a user.

14. The method of claim 11, further comprising determining, by a processor, a user's visual focal point using the input.

15. The method of claim 11, further comprising mapping, by a processor, a portion of a user's environment using the input.

16. The method of claim 2, further comprising providing, by an environmental sensor operatively coupled to the first and second head-worn devices, environmental input relating to a geographical location for capturing the image of the real-world object.

17. The method of claim 16, wherein the environmental sensor is selected from the group consisting of a camera, an optical detection device, a motion capture device, a depth measurement device, a facial recognition device, an object recognition device, an audio recognition device, a CMOS sensor, a field-of-view sensor, and an optical-enhancing sensor.

18. The method of claim 16, wherein the environmental input is selected from the group consisting of motion capture data, gesture recognition date, depth sensing data, facial recognition data, object recognition data, unique object feature recognition data, audio recognition data, voice recognition data, acoustic source localization data, noise reduction data, infrared light data, laser light data, CMOS sensor data, field-of-view data, and optical-enhancing data.

19. The method of claim 2, wherein the virtual object is a building, and wherein the first and second head-worn devices are configured to display a virtual tour of the building to the first and second users, respectively.

20. The method of claim 2, wherein the virtual object is a three dimensional drawing of a manufactured object.

21. The method of claim 1, wherein a view of the virtual object displayed to the second user through the second head-worn device allows the second user to visualize activity of the first user as though the second user is looking over a shoulder of the first user.

22. The method of claim 1, wherein the first user, through the first head-worn device, and the second user, through the second head-worn device, collaboratively view the virtual object.

23. The method of claim 1, wherein the first user, through the first head-worn device, and the second user, through the second head-worn device, collaboratively manipulate the virtual object.

24. The method of claim 1, wherein
the view of the virtual object displayed to the second user through the second head-worn device allows the second user to visualize activity of the first user as though the second user is looking over a shoulder of the first user, and
the first user, through the first head-worn device, and the second user, through the second head-worn device, collaboratively view and manipulate the virtual object.

25. The method of claim 24, further comprising communicating, between the first head-worn device and the second head-worn device, media including audio, texture, vibrations, and smell detected by respective sensors of respective first and second head-worn devices.

26. The method of claim 1, wherein the first user is located at a first geographic location and the second user is located in a second geographic location different from the first geographic location, further comprising:
modifying the virtual object based on the first user manipulating a first user interface of the first head-worn device, the first user interface selected from the group consisting of a haptic interface device, a keyboard, a mouse, a joystick, a motion capture controller, an optical tracking device, and an audio input device;
modifying the virtual object based on the second user manipulating a second user interface of the second head-worn device, the second user interface selected from the group consisting of a haptic interface device, a keyboard, a mouse, a joystick, a motion capture controller, an optical tracking device, and an audio input device,
communicating respective modifications to the virtual object between the first head-worn device and the second head-worn device through a network, wherein
the view of the virtual object displayed to the second user through the second head-worn device allows the second user to visualize activity of the first user as though the second user is looking over a shoulder of the first user, and
the first user, through the first head-worn device, and the second user, through the second head-worn device, collaboratively view and manipulate the virtual object.

* * * * *